US009683524B2

(12) United States Patent
Takagi et al.

(10) Patent No.: US 9,683,524 B2
(45) Date of Patent: Jun. 20, 2017

(54) FUEL VAPOR LEAKAGE DETECTION DEVICE AND METHOD FOR CONTROLLING THE SAME

(71) Applicant: DENSO CORPORATION, Kariya, Aichi-pref. (JP)

(72) Inventors: Kosei Takagi, Nagoya (JP); Shigeru Hasegawa, Nagoya (JP); Tomohiro Itoh, Tokai (JP)

(73) Assignee: DENSO CORPORATION, Kariya (JP)

( * ) Notice: Subject to any disclaimer, the term of this patent is extended or adjusted under 35 U.S.C. 154(b) by 187 days.

(21) Appl. No.: 14/824,166

(22) Filed: Aug. 12, 2015

(65) Prior Publication Data

US 2016/0061155 A1 Mar. 3, 2016

(30) Foreign Application Priority Data

Sep. 2, 2014 (JP) ................................ 2014-177964

(51) Int. Cl.
*G01M 3/00* (2006.01)
*F02M 25/08* (2006.01)

(52) U.S. Cl.
CPC ...... *F02M 25/0818* (2013.01); *F02M 25/089* (2013.01)

(58) Field of Classification Search
CPC ............ E21B 47/1025; G01M 3/2853; G01M 3/2815; G01M 3/26; G01M 3/202; G01M 3/20; G01M 3/226; G01N 3/12; G01B 13/22; F02M 25/0809; F02M 25/0818; F02M 2025/0845; F02M 65/00; F02M 65/002; F02M 25/089; F02M 25/0854; F02M 25/0836; F02M 25/08; F02D 41/221
USPC ............ 73/40.5 R, 40.7, 37, 114.39, 114.41; 123/518
See application file for complete search history.

(56) References Cited

U.S. PATENT DOCUMENTS

2012/0132179 A1 5/2012 Kobayashi et al.

FOREIGN PATENT DOCUMENTS

JP 2012117381 * 6/2012 ......... F02M 25/0818

* cited by examiner

*Primary Examiner* — John Fitzgerald
*Assistant Examiner* — Truong Phan

(57) ABSTRACT

A filter element is accommodated in a filter case. A housing is affixed to the filter case. A partition plate is located between the filter case and the housing. A switching valve is equipped in the housing. The switching valve includes a solenoid actuator, a valve, and a valve seat member. A vibration transmission member is located on one side in a driving direction of the valve relative to the valve seat member. The vibration transmission member is in contact with the switching valve at one end and is in contact with the partition plate at the other end. The vibration transmission member transmits oscillation, which is caused when the valve is seated on the valve seat, to the filter element through the partition plate.

7 Claims, 7 Drawing Sheets

FUEL VAPOR LEAKAGE DETECTION DEVICE AND METHOD FOR CONTROLLING THE SAME

CROSS REFERENCE TO RELATED APPLICATION

This application is based on reference Japanese Patent Application No. 2014-177964 filed on Sep. 2, 2014, the disclosure of which is incorporated herein by reference.

TECHNICAL FIELD

The present disclosure relates to a fuel vapor leakage detection device. The present disclosure further relates to a method for controlling the fuel vapor leakage detection device.

BACKGROUND

Conventionally, a fuel vapor leakage detection device is known. A fuel vapor leakage detection device may be configured to detect leakage of fuel vapor from a fuel tank, which is installed in a vehicle, and a canister, which adsorbs fuel vapor generated in the fuel tank, and/or the like. A fuel vapor leakage detection device may include an atmospheric passage, a tank passage, a switching valve, a pump and/or the like. The atmospheric passage may be communicated with the atmosphere. The tank passage may be communicated with the fuel tank. The switching valve may switch communication and blockade between the atmospheric passage and the tank passage. The pump may depressurize the fuel tank through the tank passage. When an engine of a vehicle is stopped, the fuel vapor leakage detection device may drive the pump to depressurize the interior of the fuel tank through the tank passage. The fuel vapor leakage detection device may detect pressure change in the state thereby to detect leakage of fuel vapor from the fuel tank, the canister, and/or the like.

To the contrary, when the engine is in operation, the fuel vapor leakage detection device may communicate the atmospheric passage with the tank passage and to flow air from those passages through the canister into an engine intake passage, thereby to purge vapor fuel, which is absorbed in the canister, into the engine intake passage. In addition, when fuel is supplied into the fuel tank, the fuel vapor leakage detection device may enable to communicate the atmospheric passage with the tank passage to draw atmospheric air from those passages into the fuel tank, before a fueling port of the fuel tank is opened. In this way, the fuel vapor leakage detection device may enable to manipulate pressure in the fuel tank to be close to the atmospheric pressure.

A fuel vapor leakage detection device disclosed in Patent Document 1 includes a filter case and a housing, which are integrated with each other. The filter case accommodates a filter element, which captures dust contained in air drawn into the atmospheric passage. The housing accommodates a switching valve, a pump, and/or the like.

(Patent Document 1)

Publication of unexamined Japanese patent application No. 2012-117381

As the filter element captures dust, the captured duct may be deposited on the filter element to clog the filter element.

SUMMARY

For example, it may be assumable to downsize a filter element, as a fuel vapor leakage detection device is downsized. Consequently, a quantity of dust, which the filter element can capture, may decrease. When dust accumulates on a filter element, airflow resistance may increase when air passes through the filter element. As a result, when the fueling port of a fuel tank is opened, air is hard to be drawn from the filter element into the fuel tank after passing through the atmospheric passage, the tank passage, and/or the like. Consequently, it may take longer until the atmospheric pressure in the fuel tank becomes close to the atmospheric pressure.

The fuel vapor leakage detection device disclosed in Patent Document 1 includes the switching valve and the filter case. The switching valve includes a valve. The switching valve has an end on one side in a driving direction of the valve. In the configuration of Patent Document 1, the end of the switching valve on the one side and the filter case form a space therebetween. Therefore, the configuration of Patent Document 1 may hard to transmit oscillation of the switching valve to the filter case. Therefore, the configuration of Patent Document 1 may hard to remove dust deposited on the filter element by utilizing oscillation caused by the switching valve. It is further noted that, in the fuel vapor leakage detection device according to the Patent Document 1, air may flow from the fuel tank through the tank passage and the atmospheric passage into the filter element when the fueling port of the fuel tank is opened. In this case, dust deposited on the filter element may be partially removed. However, a frequency to open the fueling port of the fuel tank may be relatively low. Therefore, it may be difficult to remove dust deposited on the filter element sufficiently.

The present disclosure may address the concern.

According to one aspect of the present disclosure, a fuel vapor leakage detection device is configured to detect leakage of fuel vapor from at least one of a fuel tank and a canister. The canister is configured to adsorb fuel vapor in the fuel tank. The fuel vapor leakage detection device comprises a filter case having an air feed port communicated to atmosphere. The fuel vapor leakage detection device further comprises a filter element accommodated in the filter case and configured to capture dust, which is contained in vapor passing through the filter case. The fuel vapor leakage detection device further comprises a housing affixed to the filter case. The fuel vapor leakage detection device further comprises a partition plate located between the filter case and the housing. The fuel vapor leakage detection device further comprises a pump located in the housing. The fuel vapor leakage detection device further comprises a pump passage. The pump is configured to increase and decrease pressure in the pump passage. The fuel vapor leakage detection device further comprises a pressure sensor configured to detect pressure in the pump passage. The fuel vapor leakage detection device further comprises a tank passage configured to communicate with the fuel tank through the canister. The fuel vapor leakage detection device further comprises an atmospheric passage communicating with atmosphere through a vent, which is formed in the partition plate, and the filter case. The fuel vapor leakage detection device further comprises an orifice equipped in an orifice passage, which communicates the tank passage with the pump passage. The fuel vapor leakage detection device further comprises a switching valve equipped in the housing. The switching valve includes a solenoid actuator, a valve driven by the solenoid actuator, and a valve seat member. The valve is configured to be seated on the valve seat and to be lifted from the valve seat. The switching valve is configured to switch communication and blockade between the tank passage and the atmospheric passage or the pump passage. The fuel vapor leakage detection device further comprises a vibration transmission member located on one side in a driving direction of the valve relative to the valve seat member. The vibration transmission member has one end in contact with the switching valve and has an other end in contact with the partition plate. The vibration transmission member is configured to transmit oscillation, which is caused when the valve is seated on the valve seat, to the filter element through the partition plate.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Embodiment

Figure 1:
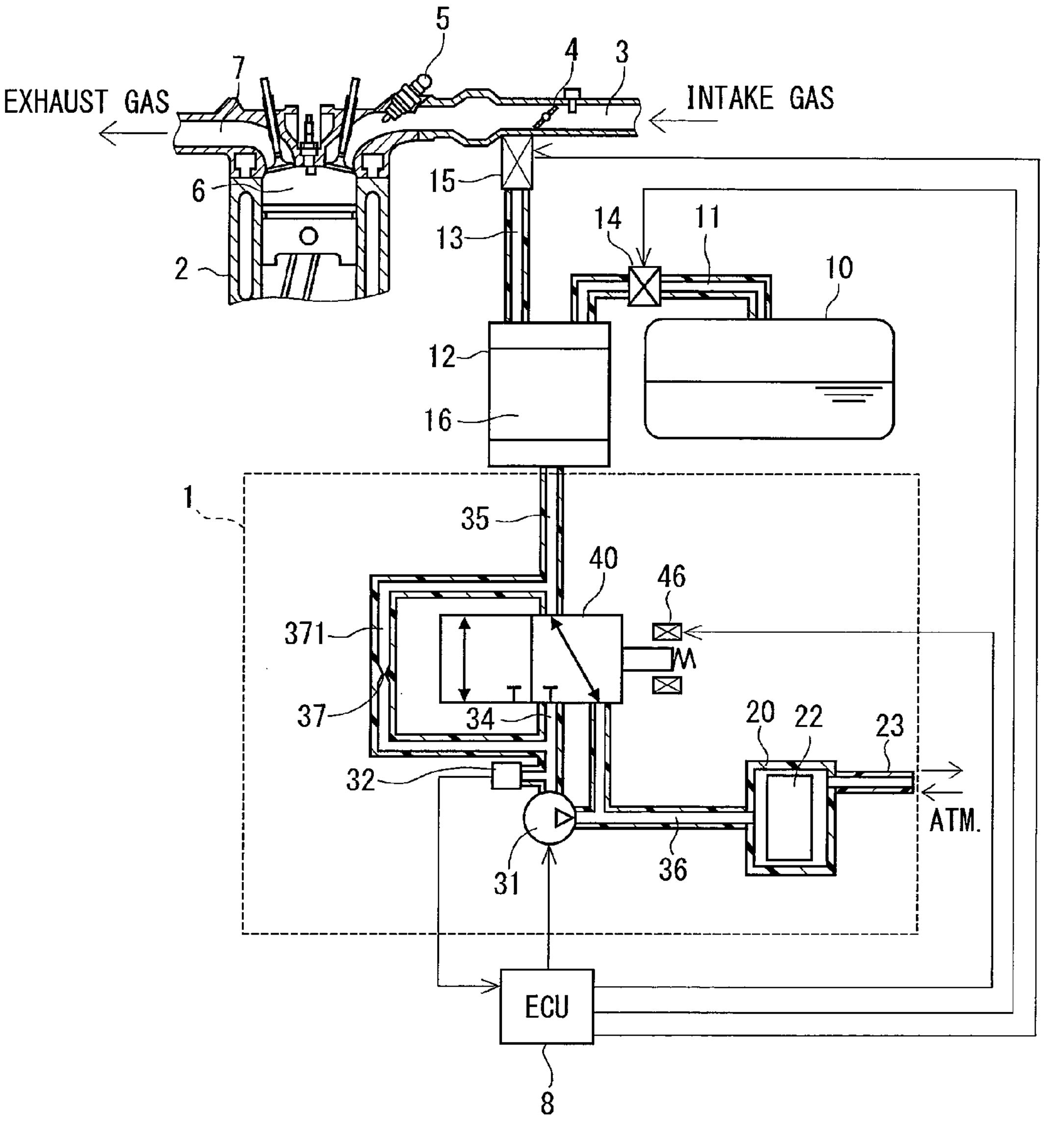
FIG. 1 is a schematic diagram showing a fuel vapor leakage detection device according to one embodiment of the present disclosure and an intake system of an engine, which employs the fuel vapor leakage detection device.

As follows, a fuel vapor leakage detection device according to one embodiment of the present disclosure and a control method for the fuel vapor leakage detection device will be described with reference to drawings. As shown in FIG. 1, the fuel vapor leakage detection device 1 is employed in, for example, an intake system of an internal combustion engine 2. The internal combustion engine 2 is equipped in a vehicle. A throttle valve 4 is equipped in an intake passage 3. The engine 2 draws air through the intake passage 3. An injector 5 is equipped in the intake passage 3. The injector 5 is located closer to the engine 2 than the throttle valve 4. The injector 5 injects fuel into the intake passage 3. The injected fuel is mixed with air, which flows through the intake passage 3, to form air-fuel mixture. The air-fuel mixture is drawn into a combustion chamber 6 of the engine 2. The air-fuel mixture is burned in the combustion chamber 6, and thereafter, the burned gas is exhausted through an exhaust passage 7 to the atmosphere.

A fuel tank 10 is communicated with the intake passage 3 through a first purge passage 11, a canister 12, and a second purge passage 13. A first purge valve 14 is equipped in the first purge passage 11. A second purge valve 15 is equipped in the second purge passage 13. Fuel stored in the fuel tank 10 evaporates to form vapor fuel (evaporative emission) inside the fuel tank 10. The vapor fuel flows through the first purge passage 11, when the first purge valve 14 is opened. The canister 12 accommodates an adsorption material 16 formed of, for example, activated carbon. The canister 12 absorbs and holds a part of vapor fuel, which flows through the first purge passage 11. When the second purge valve 15 opens while the engine 2 is in operation, a part of vapor fuel, which is absorbed and held in the adsorption material 16 of the canister 12, is removed from the adsorption material 16. The removed fuel is drawn through the intake passage 3 and is exhausted (purged) into the second purge passage 13.

Figure 2:
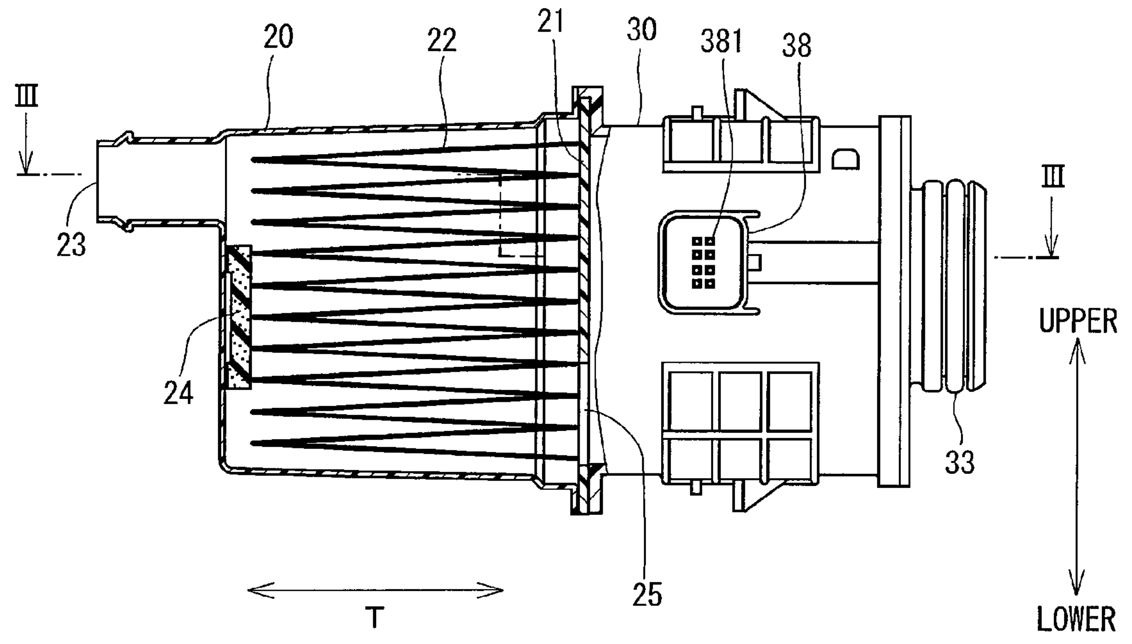
FIG. 2 is a partial sectional view showing the fuel vapor leakage detection device according to the one embodiment.
Figure 3:
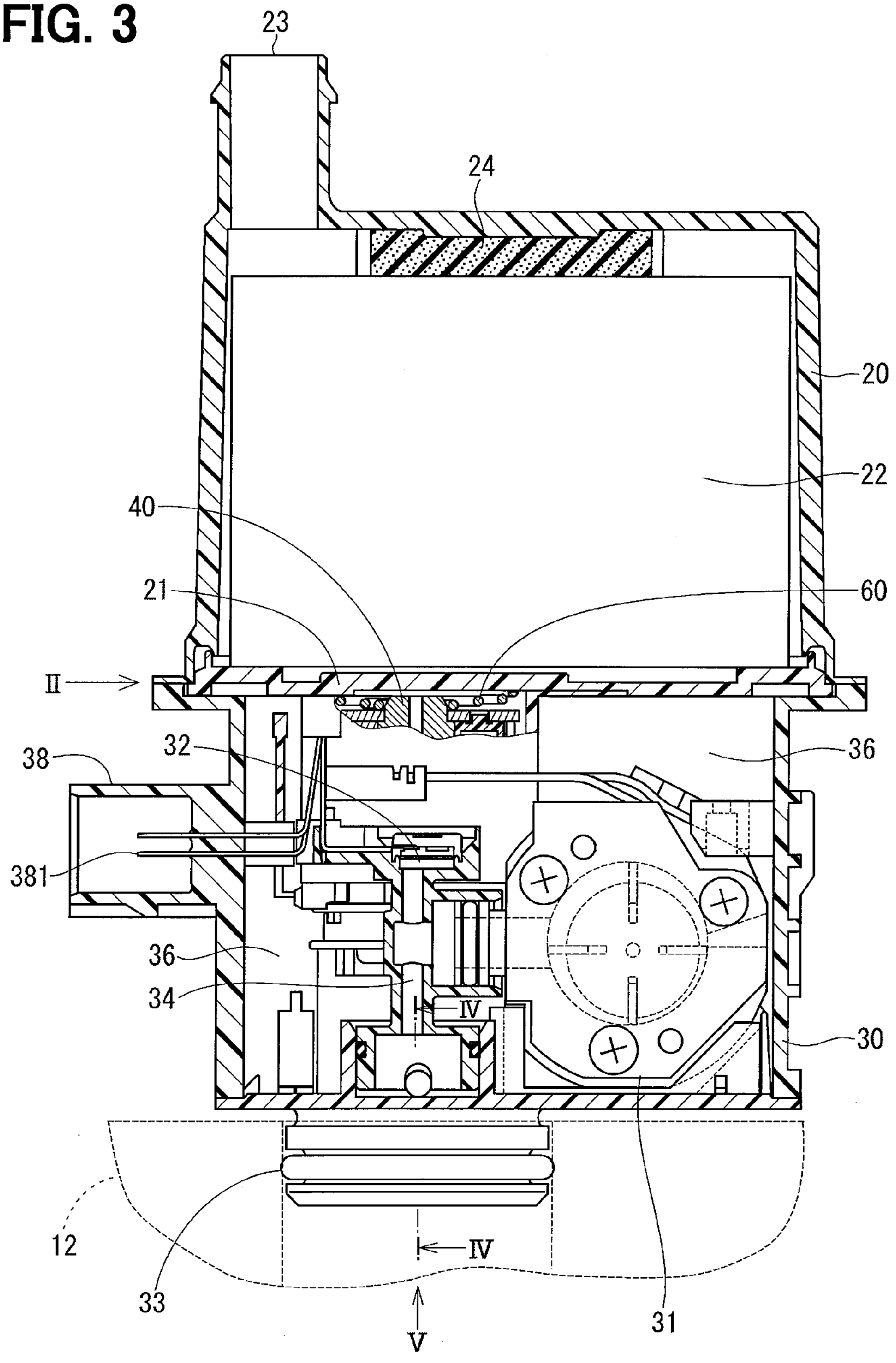
FIG. 3 is a sectional view taken along the line III-III in FIG. 2.

The fuel vapor leakage detection device 1 is configured to detect leakage of fuel vapor, which is from the fuel tank 10, the canister 12, the first purge passage 11, and/or the second purge passage 13, to fresh air. As shown in FIGS. 1 to 3, the fuel vapor leakage detection devices 1 includes a filter case 20, a filter element 22, a housing 30, a pump 31, a pressure sensor 32, a switching valve 40, a coil spring 60, and/or the like. The coil spring 60 may function as a vibration transmission member.

The filter case 20 is in a bottomed cornered tubular shape. The filter case 20 is affixed to the housing 30. A partition plate 21 is interposed between the filter case 20 and the housing 30. The filter case 20 accommodates the filter element 22. The filter case 20 has a wall located on the opposite side of the housing 30, and the wall of the filter case 20 has an air feed port 23. The air feed port 23 is communicated with the atmosphere. In FIG. 2 and FIGS. 6 to 9, UPPER represents an upper side relative to the gravity direction, and LOWER represents a lower side relative to the gravity direction in the state where the fuel vapor leakage detection device 1 is installed in the vehicle. The air feed port 23 is located on the upper side of a half of the filter element 22 relative to the gravity direction.

The filter element 22 is, for example, a filter material such as nonwoven fabric. More specifically, the filter element 22 may be formed by, for example, folding nonwoven fabric, which in a plate shape, for two or more times. The filter element 22 captures dust contained in vapor, which passes through the interior of the filter case 20. Therefore, dust contained in atmosphere, which flows from the air feed port 23 through the interior of the filter case 20 into the housing 30, is captured with the filter element 22.

Figure 6:
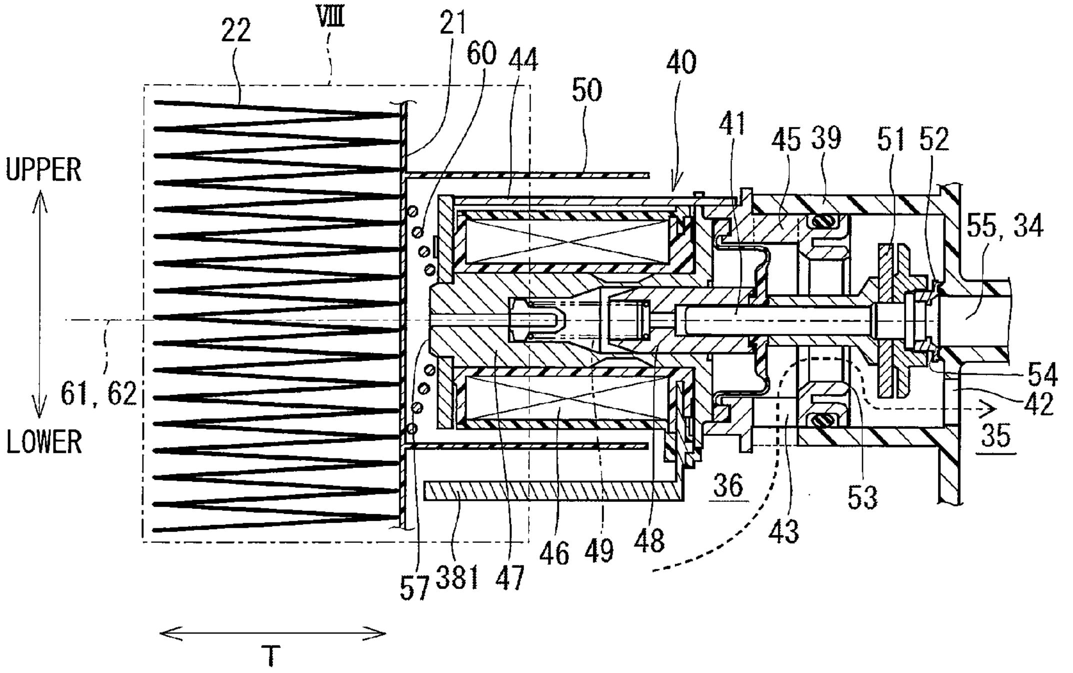
FIG. 6 is a sectional view showing a switching valve, a partition plate, and a filter element.

In FIG. 6, the filter element 22 is affixed to the partition plate 21. The partition plate 21 is equipped to one side in a driving direction of the a valve 41 of the switching valve 40. The switching valve 40 will be described later in detail. The filter material of the filter element 22 is folded to be stacked one another. Thus, the filter material is folded to be turned around (turned over, turned back) to extend along a turnaround direction back and forth. The turnaround direction is substantially in parallel with the driving direction of the valve 41. More specifically, the cross section of the filter material extends in an extending direction, and the extending direction is steeply changed at a folded line along which the filter material is folded. Thus, the cross section of the filter material is directed back and forth along the turnaround direction. The cross section of the filter material may be in a zigzag shape. In FIG. 2 and FIGS. 6 to 9, an arrow T represents the turnaround direction along which the filter material extends back and forth. It is noted that, the term "substantially in parallel with" may cover (incorporate) a state in which an angle of the surface of the filter material is strictly in parallel with the driving direction of the valve 41.

In addition, the term "substantially in parallel with" may cover a state in which the angle of the surface of the filter material is at an acute angle to the driving direction of the valve 41. The acute angle may vary according to the number of the sheets of the filter materials, which overlap one another.

The filter element 22 is affixed to the partition plate 21 by using, for example, adhesive. A biasing member 24 is equipped inside the filter case 20. The biasing member 24 is located on the opposite side of the filter element 22 from the partition plate 21. The biasing member 24 is formed of, for example, a sponge and/or the like. The biasing member 24 is configured to bias the filter element 22 onto the partition plate 21, when, for example, the filter element 22 is affixed to the partition plate 21 by using adhesive.

The housing 30 is in a bottomed cornered tubular shape. The housing 30 has a connecting pipe 33. The connecting pipe 33 is located on the opposite side of the housing 30 from the filter case 20. The connecting pipe 33 is connected to the canister 12. The housing 30 accommodates the pump 31, the pressure sensor 32, the switching valve 40, the coil spring 60, and/or the like. The housing 30 has an interior having a pump passage 34, a tank passage 35, an atmospheric passage 36, an orifice 37 and/or the like.

An electronic control unit (ECU) 8 controls electricity supplied to the pump 31 thereby to reduce pressure in the pump passage 34 formed in the housing 30. When the pump 31 depressurizes the pump passage 34, the pump 31 draws air inside the pump passage 34 through the interior of the pump 31 to discharge the air toward the atmospheric passage 36. The pressure sensor 32 is connected to the pump passage 34 to detect pressure in the pump passage 34. The pressure sensor 32 sends a signal through a terminal 381 of a connector 38 to the ECU 8. The connector 38 is equipped to the housing 30.

Figure 4:
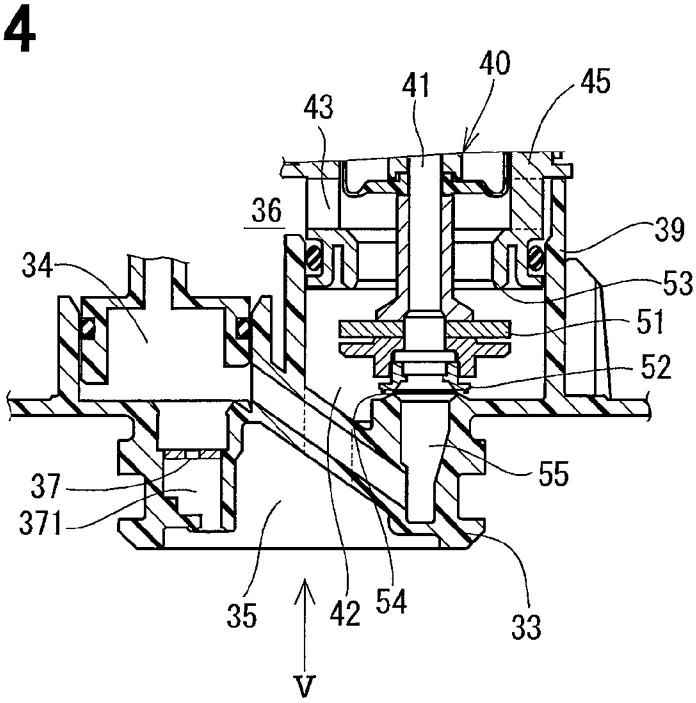
FIG. 4 is a sectional view taken along the line IV-IV in FIG. 3.
Figure 5:
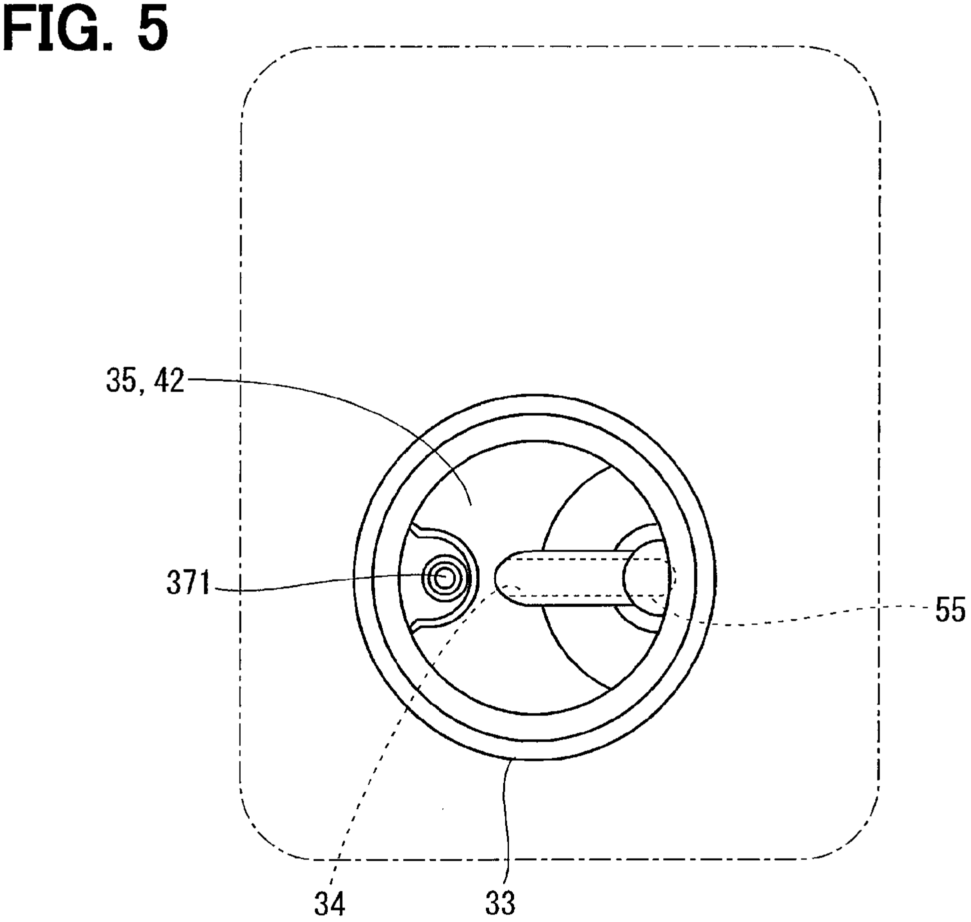
FIG. 5 is a view when being viewed along the arrows V in FIGS. 3 and 4.

As shown in FIGS. 1 to 6, the tank passage 35 has one end communicated with a tank-passage port 42. In FIGS. 4 and 6, the tank-passage port 42 is equipped to the switching valve 40. The tank passage 35 has the other end communicated with the canister 12 through the connecting pipe 33. Therefore, the tank passage 35 is communicated with the fuel tank 10 through the canister 12. A vent 25 (refer to FIG. 2) is formed in the partition plate 21 and is located inside the inner wall of the housing 30. The atmospheric passage 36 is extended from the vent 25 through the interior of the filter case 20 and is communicated with the atmosphere. The atmospheric passage 36 is partially communicated with an atmospheric passage port 43 (refer to FIGS. 4 and 6). The atmospheric passage port 43 is formed in the switching valve 40. An orifice passage 371 communicates the tank passage 35 with the pump passage 34. The orifice passage 371 is equipped with the orifice 37.

Figure 7:
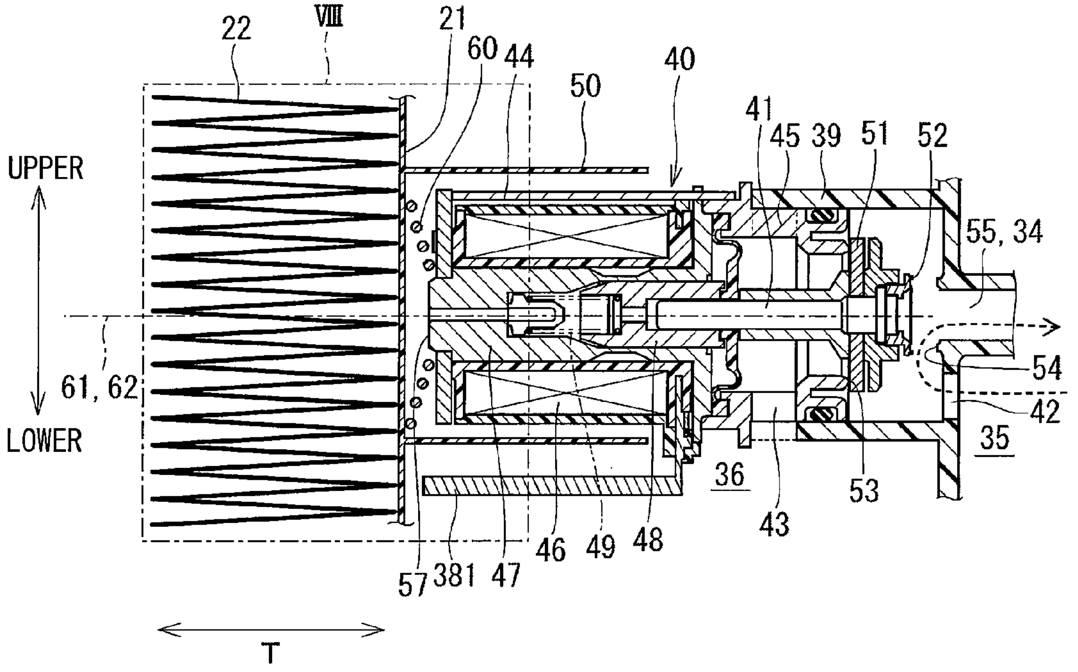
FIG. 7 is a sectional view showing the switching valve, the partition plate, and the filter element.

It is noted that, FIGS. 1, 4, and 6 show a state in which electricity supply to the switching valve 40 is terminated (turned off). In this present state, the atmospheric passage 36 is communicated with the tank passage 35, and the pump passage 34 is communicated with the tank passage 35. To the contrary, as shown in FIG. 7, when electricity supply to the switching valve 40 is implemented (turned on), the atmospheric passage 36 is blocked from the tank passage 35, and the pump passage 34 is communicated with the tank passage 35. The present configuration may enable the switching valve 40 to switch between a first state and a second state. In the first state, the tank passage 35 is communicated with the atmospheric passage 36 and is blocked from the pump passage 34. In the second state, the tank passage 35 is blocked from the atmospheric passage 36 and is communicated with the pump passage 34.

As shown in FIGS. 6 and 7, the switching valve 40 is equipped in the housing 30. The switching valve 40 includes a solenoid actuator 44, the valve 41, a valve seat member 45, and/or the like. The solenoid actuator 44 is configured with a coil 46, a stationary core 47, a moving core 48, a spring 49, and/or the like. The spring 49 is equipped between the stationary core 47 and the moving core 48. As shown in FIG. 6, when electricity is not supplied to the coil 46, the spring 49 applies a biasing force to the moving core 48 to move the moving core 48 away from the stationary core 47.

As shown in FIG. 7, when the ECU 8 starts to supply electricity through the terminal 381 to the coil 46, the coil 46 creates a magnetic field. The magnetic field of the coil 46 generates a magnetic attractive force between the stationary core 47 and the moving core 48. Thus, the coil 46 magnetically attracts the moving core 48 toward the stationary core 47 against the biasing force of the spring 49. A thermal shield plate 50 is in a tubular shape extended from the partition plate 21. The thermal shield plate 50 is located on the radially outside of the solenoid actuator 44. The pressure sensor 32 is located in the vicinity of the solenoid actuator 44. The thermal shield plate 50 restricts heat, which is generated from the solenoid actuator 44, from transmitting to the pressure sensor 32.

The valve 41 is affixed to the moving core 48. A first valve element 51 is in a disc-shape. A second valve element 52 is in a tubular shape. The first valve element 51 and the second valve element 52 are located on the opposite side of the valve 41 from the moving core 48. The valve seat member 45 is in a tubular shape and is affixed to the solenoid actuator 44. A support portion 39 is in a substantially tubular shape and is equipped inside the housing 30. The valve seat member 45 has a portion on the opposite side of the solenoid actuator 44, and the portion of the valve seat member 45 is inserted in the support portion 39. The valve seat member 45 has a first valve seat 53. The first valve element 51 is configured to be seated on the first valve seat 53 and to be lifted from the first valve seat 53. The valve seat member 45 has a wall located closer to the solenoid actuator 44 than the first valve seat 53, and the wall of the valve seat member 45 has the atmospheric passage port 43. The atmospheric passage port 43 is communicated with the atmospheric passage 36. The first valve seat 53 of the present embodiment may be equivalent to one example of a valve seat.

The housing 30 has a second valve seat 54 inside the support portion 39. The second valve element 52 is configured to be seated on the second valve seat 54 and to be lifted from the second valve seat 54. The second valve seat 54 has an interior defining a pump port passage 55. The pump port passage 55 is communicated with the pump passage 34. The housing 30 has a wall, which is located outside the second valve seat 54 and is located inside the support portion 39, and the wall of the housing 30 defines the tank-passage port 42. The tank-passage port 42 is communicated with the tank passage 35.

Figure 8:
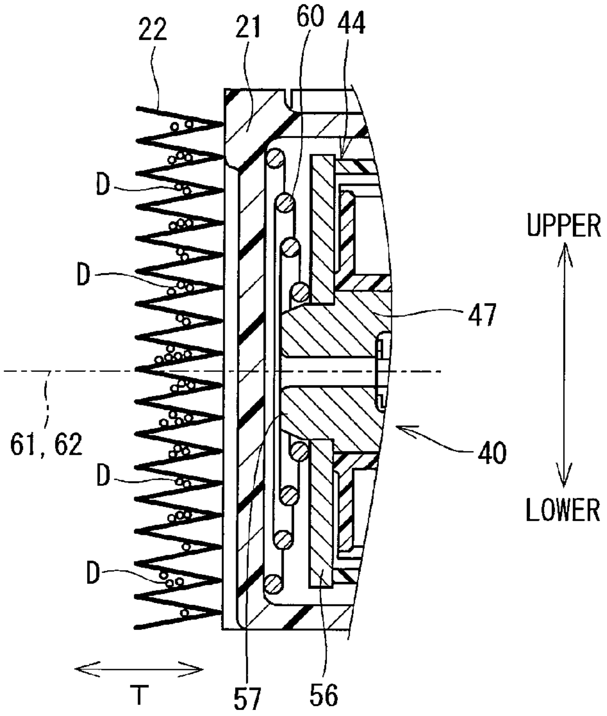
FIG. 8 is an enlarged view showing a portion VIII in FIGS. 6 and 7.

As shown in FIG. 8, the coil spring 60 may function as a vibration transmission member. The coil spring 60 is located on one side in the driving direction of the valve 41 relative to the first valve seat 53 and the second valve seat 54. The coil spring 60 is a compression coil spring in a conical shape. The coil spring 60 has one end on a small-diameter side, and the one end is in contact with the solenoid actuator 44 of the switching valve 40. The coil spring 60 has the other end on a large-diameter side, and the other end is in contact with the partition plate 21. The one end of the coil spring 60 on the small-diameter side is fitted to a projection 57 of the stationary core 47. The projection 57 of the stationary core 47 is projected from the yoke 56 of the solenoid actuator 44. A center axis 61 of the coil spring 60 and a center axis 62 of the valve 41 are coaxial with each other.

The coil spring 60 biases the switching valve 40 toward the support portion 39 of the housing 30. The present configuration may maintain the switching valve 40 being coaxial with the support portion 39 of the housing 30. In addition, the coil spring 60 is in the coaxial shape. Therefore, the present configuration enables to downsize the structure in the axial direction when the coil spring 60 is compressed. In addition, the present configuration enables to reduce the distance between the switching valve 40 and the partition plate 21.

When the first valve element 51 of the valve 41 is seated onto the first valve seat 53, impact may occur to cause oscillation. The coil spring 60 is set to create a biasing force to enable to maintain the valve seat member 45 of the switching valve 40 being in contact with the support portion 39 of the housing 30 even though the oscillation is caused due to the impact. When the first valve element 51 of the valve 41 is seated onto the first valve seat 53, oscillation may occur. The coil spring 60 is set to enable to transmit this oscillation to the partition plate 21. Therefore, when the first valve element 51 of the valve 41 of the switching valve 40 is seated onto the first valve seat 53, oscillation is generated and is transmitted from the coil spring 60 through the partition plate 21 to the entire region of the filter element 22 affixed to the partition plate 21. FIG. 8 schematically shows the filter element 22 and dust D deposited on the filter element 22. The dust D is mainly deposited on the filter element 22 on the side of the air feed port 23. When oscillation is transmitted to the filter element 22, the dust D is slapped away from the surface of the filter element 22.

Referring back to FIG. 6, when electricity is not supplied to the coil 46 of the switching valve 40, the spring 49 equipped between the stationary core 47 and the moving core 48 applies the biasing force to the moving core 48 to move the moving core 48 away from the stationary core 47. The valve 41 is affixed to the moving core 48. The second valve element 52 of the valve 41 is seated on the second valve seat 54. The first valve element 51 of the valve 41 is lifted from the first valve seat 53.

As shown in FIG. 7, when electricity is supplied to the coil 46 of the switching valve 40, the moving core 48 is magnetically attracted toward the stationary core 47 against the biasing force of the spring 49. The valve 41 is affixed to the moving core 48. The second valve element 52 of the valve 41 is lifted from the second valve seat 54. The first valve element 51 of the valve 41 is seated on the first valve seat 53. At this time, impact occurs to cause oscillation, and the oscillation is transmitted from the valve seat member 45 to the entire region of the filter element 22 after passing through the solenoid actuator 44, the coil spring 60, and the partition plate 21. As described above, the filter element 22 is arranged such that the turnaround direction T of the filter material in the plate shape is substantially in parallel with the driving direction of the valve 41. The filter material in the plate shape is folded one another and stacked one another to have deep portions each in a valley shape. The filter material captures dust, and consequently, the dust may be deposited in the deep portions. Even when the dust is deposited in the deep portions, the oscillation may slap the dust away from the filter material to the opposite side of the switching valve 40.

Figure 9:
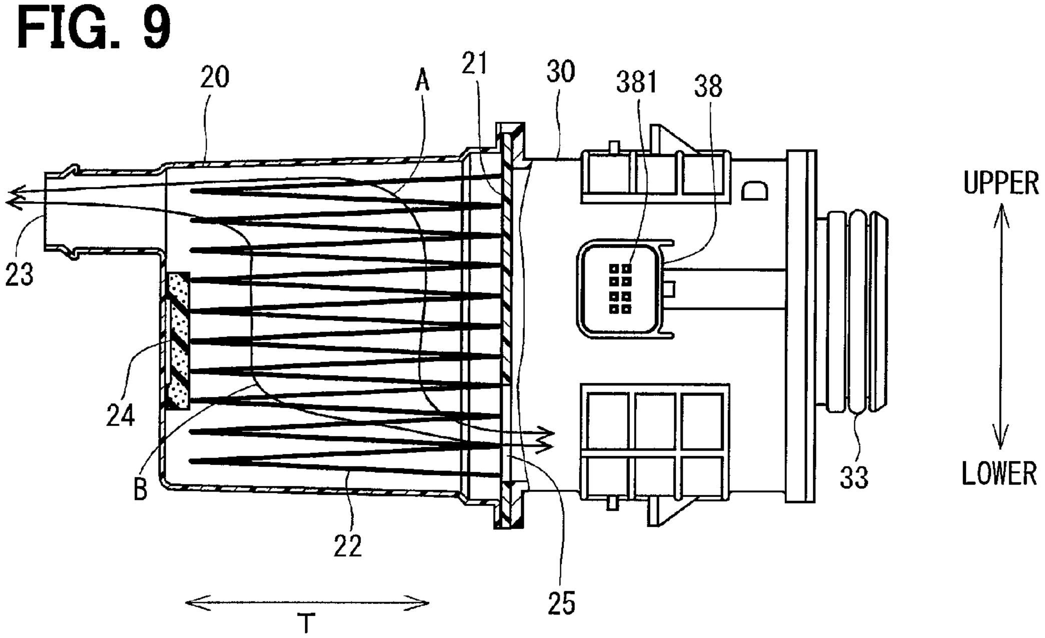
FIG. 9 is a partial sectional view showing the fuel vapor leakage detection device according to the one embodiment.

In FIG. 9, an arrow A schematically represents a path of air, which flows through the interior of the filter case 20, immediately after starting usage of the fuel vapor leakage detection device 1. In addition, an arrow B schematically represents a path of air, which flows through the interior of the filter case 20, after usage of the fuel vapor leakage detection device 1 for a long time period. The arrow B shows the path of air in a state where the dust deposited on the filter element 22 is removed from the filter element 22. Airflow resistance is small in the entire region in the filter case 20, immediately after starting usage of the fuel vapor leakage detection device 1. Therefore, air flows through the entire region in the filter case 20.

To the contrary, when dust deposited on the filter element 22 is removed from the filter element 22, the dust tends to move toward the lower side in the gravity direction due to application of gravity. The filter case 20 has the air feed port 23 on the upper side relative to the gravity direction from the half (half level) of the filter element 22. Therefore, even in this case, the airflow resistance of the filter element 22 in proximity to the air feed port 23 is maintained at a small level. Thus, as represented by the arrow B, the fuel vapor leakage detection device 1 is enabled to flow air from the air feed port 23 through the interior of the filter case 20 to the vent 25 of the partition plate 21.

Figure 10:
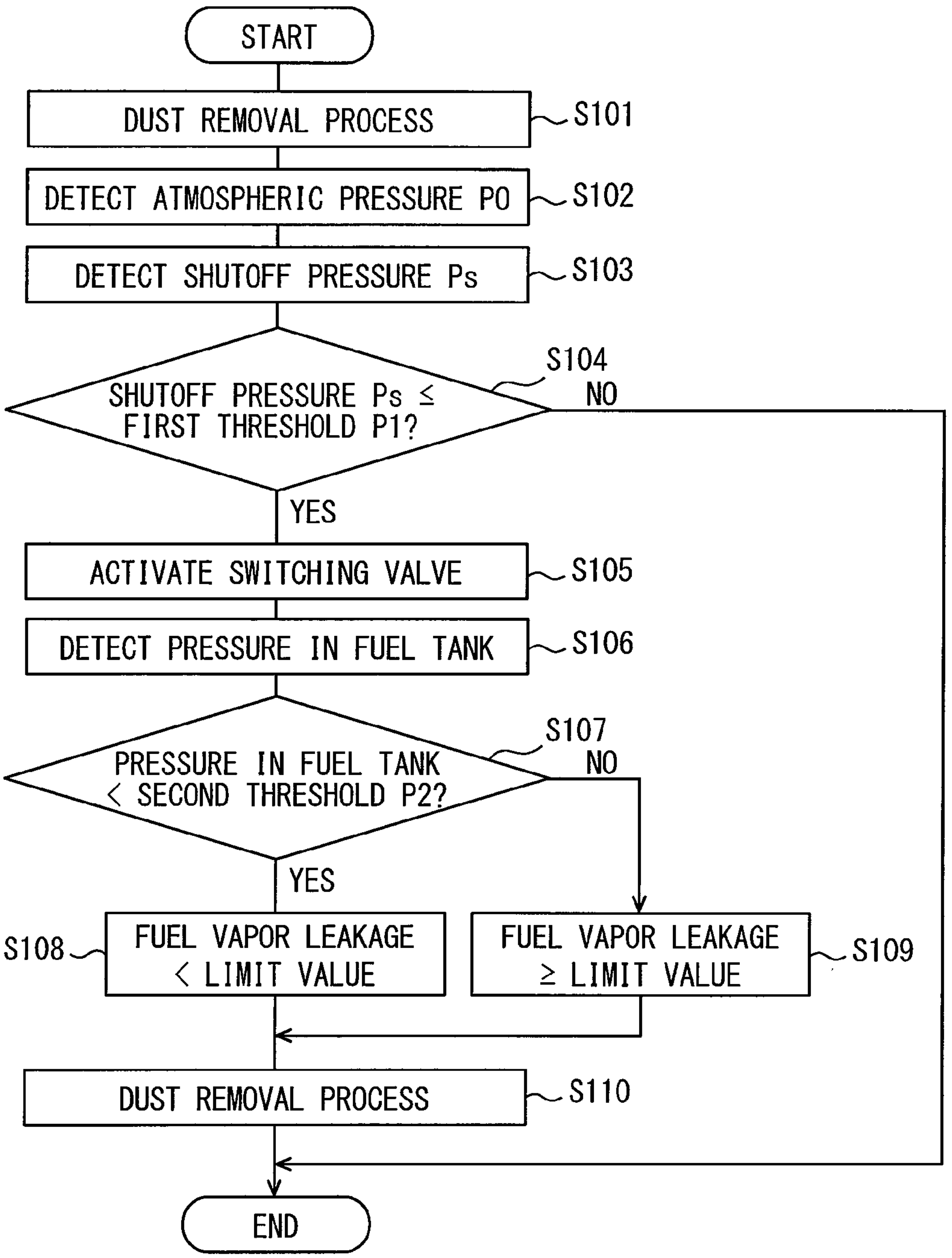
FIG. 10 is a flowchart showing a control method for the fuel vapor leakage detection device according to the one embodiment.

Subsequently, a control method of the fuel vapor leakage detection device 1 will be described with reference to a flowchart in FIG. 10. The ECU 8 drives and controls the fuel vapor leakage detection device 1. The ECU 8 activates the fuel vapor leakage detection device 1 after a predetermined time elapses subsequent to deactivation of the engine 2. Thus, the ECU 8 implements fuel vapor leakage detection for fuel vapor leakage from the fuel tank 10 and the canister 12. It is noted that, the predetermined time period is set at a value, which is required to stabilize the temperature of the vehicle.

First, at step 101, the ECU 8 implements a dust removal process before implementing a fuel vapor leakage detection. The ECU 8 manipulates the switching valve 40 once or manipulates the switching valve 40 twice or more in the dust removal process. In this way, dust deposited on the filter element 22 is slapped away from the filter element 22.

Subsequently, at step 102, the ECU 8 detects the atmospheric pressure P0. In the present state, electricity supply to the pump 31 and the switching valve 40 is terminated (turned OFF). Therefore, the switching valve 40 communicates the atmospheric passage 36 with the tank passage 35 and blocks the tank passage 35 from the pump passage 34. In the present state, the pump passage 34 is communicated with the atmospheric passage 36 through the orifice passage 371, the tank passage 35, and the switching valve 40. In addition, the pump passage 34 is communicated with the atmospheric passage 36 through the interior of the pump 31. Therefore, the atmospheric pressure P0 is detected according to the signal from the pressure sensor 32 equipped in the pump passage 34. The ECU 8 stores the signal from the pressure sensor 32 as the atmospheric pressure P0.

Subsequently, at step 103, the ECU 8 detects a shutoff pressure Ps. The shutoff pressure Ps corresponds to a minimum pressure in the pump passage 34 when electricity supply to the switching valve 40 is terminated and when the pump 31 is driven. In the present state, the switching valve 40 terminates communication between the tank passage 35 and the pump passage 34 inside the switching valve 40. Therefore, the tank passage 35 is communicated with the pump passage 34 only through the orifice 37. Therefore, the pump passage 34 is depressurized by a pressure according to the inner diameter of an aperture of the orifice 37. The ECU 8 stores the signal from the pressure sensor 32 as the shutoff pressure Ps.

At step 104, the ECU 8 determines whether the shutoff pressure Ps detected at step 103 is less than or equal to a first threshold P1. The first threshold P1 is a value, which represents that the inner diameter of the orifice 37 is normal. The first threshold P1 is stored in the ECU 8 beforehand. When the shutoff pressure Ps is less than or equal to the first threshold P1 (step 104: YES), the ECU 8 proceeds the processing to step 105. To the contrary, when the shutoff pressure Ps is greater than the first threshold P1 (step 104: NO), the ECU 8 determines that the inner diameter of the orifice 37 is abnormal or determines that the operation of the switching valve 40 is abnormal. Thus, the ECU 8 terminates the processing.

At step 105, the ECU 8 starts to supply electricity to the switching valve 40. Thus, the switching valve 40 communicates the tank passage 35 with the pump passage 34 and blocks the tank passage 35 from the atmospheric passage 36. Therefore, the pump passage 34 is communicated with the fuel tank 10 through the tank passage 35 and the canister 12. Thus, pressure in the pump passage 34 becomes the same as pressure in the fuel tank 10 and pressure in the canister 12.

At step 106, the ECU 8 enables the pressure sensor 32 to detect pressure in the fuel tank 10 and pressure in the canister 12. When electricity supply to the switching valve 40 is started, pressure in the pump passage 34 once increases. In the present state, the pump 31 is continued to drive. Therefore, pressure in the fuel tank 10 and pressure in the canister 12 are reduced as the time elapses.

At step 107, the ECU 8 determines whether pressure in the fuel tank 10 is less than a second threshold P2. It is noted that the second threshold P2 is a value calculated with the ECU 8 according to the shutoff pressure Ps. In the present embodiment, the first shutoff pressure Ps, which decreases to be less than or equal to the threshold P1, is used as the second threshold P2. As time elapses, pressure in the fuel tank 10 and pressure in the canister 12 decrease. When the pressure in the fuel tank 10 and the pressure in the canister 12 decrease to be less than the second threshold P2 (step 107: YES), the processing proceeds to step 108. To the contrary, when pressure in the fuel tank 10 is greater than or equal to the second threshold P2 (step 107: YES), the processing proceeds to step 109.

At step 108, the ECU 8 determines that leakage of fuel vapor from the fuel tank 10 and/or the like is less than a limit value (allowable limit). When pressure in the fuel tank 10 and/or the like decreases to be less than the second threshold P2, the present state represents that intrusion of air from the outside into the fuel tank 10 is zero or significantly small. Thus, the present state represents that an airtight property of the fuel tank 10 is maintained. Therefore, fuel vapor caused in the fuel tank 10 may not be emitted to the outside of the fuel tank 10 by an amount greater than a limit value.

At step 109, the ECU 8 determines that leakage of fuel vapor from the fuel tank 10 and/or the like is greater than or equal to the limit value (allowable limit). When pressure in the fuel tank 10 does not decrease to the second threshold P2, it is assumable that air intrudes from the outside into the fuel tank 10 and/or the like as pressure in the fuel tank 10 is reduced. Therefore, in this case, fuel vapor caused inside the fuel tank 10 may be emitted from the fuel tank 10 to the outside by an amount greater than the limit value. In the present state, the ECU 8 may implement a warning operation to activate, for example, a warning lamp and/or the like on a dashboard of the vehicle.

Subsequently, the ECU 8 terminates electricity supply to both the pump 31 and the switching valve 40. Thus, the atmospheric passage 36 is communicated with the tank passage 35. The ECU 8 confirms that pressure in the pump passage 34 substantially becomes the atmospheric pressure P0 according to the signal from the pressure sensor 32. Subsequently, the ECU 8 terminates the operation of the pressure sensor 32. The processing of the steps 102 to 109 may be equivalent to one example of a fuel vapor leakage detection process.

Subsequently, at step 110, the ECU 8 implements a dust removal process again, after implementing the fuel vapor leakage detection. In the dust removal process, the switching valve 40 is driven once or is driven twice or more. It is noted that one of step 101 and step 110 may be omitted. It is further noted that, the processing of steps 101 and 110 may be implemented between the processing of steps 102 to 109.

The fuel vapor leakage detection device 1 according to the present embodiment may produce the subsequent operation effects.

(1) According to the present embodiment, the filter case 20 and the housing 30 are affixed to each other to interpose the partition plate 21 therebetween. The coil spring 60 is equipped to the one side in the driving direction of the valve 41 relative to the valve seat member 45 of the switching valve 40. More specifically, the coil spring 60 is equipped at a position deviated from the position of the valve seat member 45 in one direction along the driving direction of the valve 41. The coil spring 60 is in contact with the switching valve 40 at the one end and is in contact with the partition plate 21 at the other end. When the valve 41 of the switching valve 40 is seated onto the first valve seat 53, oscillation may occur. The oscillation is transmitted from the coil spring 60 through the partition plate 21 to the filter element 22. Therefore, the oscillation may slap away dust, which is captured by the filter element 22, from the filter element 22. In this way, dust is removed from the filter element 22. Therefore, the present configuration may enable to increase a usable period of the filter element 22. In addition, the fuel vapor leakage detection device 1 is configured to control electricity supply to the solenoid actuator 44 of the switching valve 40, thereby to remove dust captured with the filter element 22 at an arbitrary time.

(2) According to the present embodiment, the partition plate 21 is located on the one side in the driving direction of the valve 41 relative to the switching valve 40. The filter element 22 is affixed or fixed to the partition plate 21. The present configuration may enable to transmit oscillation, which is caused when the valve 41 of the switching valve 40 is seated onto the first valve seat 53, efficiently from the coil spring 60 through the partition plate 21 to the filter element 22.

(3) According to the present embodiment, the filter element 22 is the filter material in the plate shape, which is folded and stacked one another. The filter material may extend along a turnaround direction back and forth. The turnaround direction of the filter material in the plate shape is substantially in parallel with the driving direction of the valve 41. The present configuration may enable to transmit the oscillation efficiently to the entire region of the filter element 22 accommodated in the filter case 20. In addition, the present configuration may enable efficiently to slap away dust captured by the deep portion formed in the filter material, which is in the plate shape and is folded one another.

(4) According to the present embodiment, the coil spring 60 biases the switching valve 40 toward the support portion 39 equipped inside the housing 30. The present configuration may enable to allow the coil spring 60 to absorb a manufacture dimensional tolerance of both the housing 30 and the switching valve 40. Therefore, the present configuration may enable to maintain the position of the switching valve 40 inside the housing 30. In this way, the fuel vapor leakage detection device 1 may enable to relax a severe dimensional tolerance demanded in an assembling process of the housing 30 and the switching valve 40. Thus, the present configuration may enable to reduce a manufacturing cost of the fuel vapor leakage detection device 1.

(5) According to the present embodiment, the filter case 20 has the air feed port 23 on the upper side relative to (than) the half of the filter element 22 in the gravity direction. Dust may be slapped away from the filter element 22 to move toward the lower side of the filter case 20 in the gravity direction. Even in such a state, the present configuration may enable to maintain airflow between the air feed port 23 and the atmospheric passage 36 through the filter element 22, which is located on the upper side in the filter case 20 relative to the gravity direction. Therefore, the fuel vapor leakage detection device 1 may restrict increase in airflow resistance within the filter case 20.

The control method of the fuel vapor leakage detection device 1 according to the present embodiment may produce the following operation effects.

(6) The control method according to the present embodiment includes the dust removal process to drive the switching valve 40. The dust removal process is implemented at the start of the fuel vapor leakage detection process to detect leakage of fuel vapor from the fuel tank 10 and the canister 12 or at the end of the fuel vapor leakage detection process. The present control method may enable to implement the dust removal from the filter element 22 daily according to the operation state of the engine 2 by driving the switching valve 40 when implementing the fuel vapor leakage detection.

(7) The control method according to the present embodiment drives the switching valve 40 once or drives the switching valve 40 twice or more in the dust removal process. The present control method may efficiently enable to slap away dust from the filter element 22.

Other Embodiment (1) According to the above-described embodiments, the coil spring 60 in the conical shape is employed as the vibration transmission member. According to another embodiment, a coil spring in a tubular shape and/or a resilient member, such as a rubber member or an elastomer member, may be employed as the vibration transmission member. A resin member and/or a metallic member may be employed as the vibration transmission member.

(2) According to the above-described embodiments, the fuel vapor leakage detection is implemented by operating the pump 31 to depressurize the fuel tank 10 through the pump passage 34. To the contrary, according to another embodiment, the fuel vapor leakage detection may be implemented by operating the pump 31 to pressurize the fuel tank 10 through the pump passage 34.

(3) According to the above-described embodiments, the dust removal process is implemented together with the fuel vapor leakage detection. To the contrary, according to another embodiment, the dust removal process may be selectively implemented regardless of the fuel vapor leakage detection.

(4) According to the above-described embodiments, the filter element 22 is formed by folding the filter material, which is in the plate shape, one another. The filter material is folded and stacked one another in a stacked direction, and the stacked direction is arranged perpendicularly. That is, the stacked direction is along the gravity direction. To the contrary, according to another embodiment, the filter element 22 may be arranged such that the stacked direction, in which the filter material in the plate shape is stacked one another, is perpendicular to the gravity direction.

Summarizing the above description, the fuel vapor leakage detection device may includes the partition plate interposed and affixed between the filter case and the housing. The switching valve may be equipped in the housing. The switching valve may include the solenoid actuator, the valve, and the valve seat member. The valve may be driven by the solenoid actuator. The valve may be seated onto and lifted from the valve seat member. The vibration transmission member may be equipped on one side in the driving direction of the valve relative to the valve seat member. The vibration transmission member may be in contact with the switching valve and the partition plate. The vibration transmission member may be configured to transmit oscillation, which is caused when the valve is seated onto the valve seat, through the partition plate to the filter element.

The present configuration may enable to transmit oscillation, which is caused when the valve of the switching valve is seated onto the valve seat, from the vibration transmission member through the partition plate to the filter element. The oscillation may slap away dust captured by the filter element. In this way, dust may be removed from the filter element, thereby to elongate a usable period of the filter element. In addition, the fuel vapor leakage detection device may control electricity supply to the solenoid actuator of the switching valve thereby to enable to remove dust captured by the filter element at an arbitrary time.

The control method is for the fuel vapor leakage detection device equipped in the vehicle. The control method may include a dust removal process to drive the switching valve at the start of the fuel vapor leakage detection process, which is to detect leakage of fuel vapor from the fuel tank and/or the canister, and at the end of the fuel vapor leakage detection process. In general, fuel vapor leakage detection may be implemented subsequent to termination of operation of the engine. Therefore, the switching valve may be driven when the fuel vapor leakage detection is implemented thereby to implement the dust removal from the filter element on a daily basis according to the engine operation state.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fuel vapor leakage detection device configured to detect leakage of fuel vapor from at least one of a fuel tank and a canister, the canister configured to adsorb fuel vapor in the fuel tank, the fuel vapor leakage detection device comprising:

a filter case having an air feed port communicated to atmosphere;

a filter element accommodated in the filter case and configured to capture dust, which is contained in vapor passing through the filter case;

a housing affixed to the filter case;

a partition plate located between the filter case and the housing;

a pump located in the housing;

a pump passage, the pump being configured to increase and decrease pressure in the pump passage;

a pressure sensor configured to detect pressure in the pump passage;

a tank passage configured to communicate with the fuel tank through the canister;

an atmospheric passage communicating with atmosphere through a vent, which is formed in the partition plate, and the filter case;

an orifice equipped in an orifice passage, which communicates the tank passage with the pump passage;

a switching valve equipped in the housing, the switching valve including a solenoid actuator, a valve driven by the solenoid actuator, and a valve seat member, the valve configured to be seated on the valve seat and to be lifted from the valve seat, the switching valve configured to switch communication and blockade between the tank passage and the atmospheric passage or the pump passage; and a vibration transmission member located on one side in a driving direction of the valve relative to the valve seat member, the vibration transmission member having one end in contact with the switching valve and having an other end in contact with the partition plate, the vibration transmission member configured to transmit oscillation, which is caused when the valve is seated on the valve seat, to the filter element through the partition plate.

2. The fuel vapor leakage detection device according to claim 1, wherein the partition plate is located on one side in the driving direction of the valve relative to the switching valve, and the filter element is affixed to the partition plate.

3. The fuel vapor leakage detection device according to claim 1, wherein the filter element is a filter material in a plate shape, which is folded, the filter material is folded in a turnaround direction, and the turnaround direction is substantially in parallel with the driving direction of the valve.

4. The fuel vapor leakage detection device according to claim 1, wherein the housing has a support portion, which is in a tubular shape, inside the housing, and the vibration transmission member is a resilient member biasing the switching valve toward the support portion.

5. The fuel vapor leakage detection device according to claim 1, wherein the filter case has the air feed port on an upper side than a half of the filter element relative to a gravity direction.

6. A method for controlling the fuel vapor leakage detection device according to claim 1, the fuel vapor leakage detection device being equipped to a vehicle, the method comprising:

causing, in a fuel vapor leakage detection process, the fuel vapor leakage detection device to detect leakage of fuel vapor from at least one of the fuel tank and the canister in a state where an engine of the vehicle is stopped; and driving, in a driver dust removal process, the switching valve at a start of the fuel vapor leakage detection process or at an end of the fuel vapor leakage detection process.

7. The method according to claim 6, wherein the driving in the dust removal process includes driving the switching valve once or driving the switching valve twice or more.

* * * * *